(12) United States Patent
Allen et al.

(10) Patent No.: US 7,119,336 B2
(45) Date of Patent: Oct. 10, 2006

(54) METHOD OF MEASURING COATING USING TWO-WAVELENGTH INFRARED REFLECTANCE

(75) Inventors: Rex H. Allen, Douglass, KS (US); Kim E. Graebner, Derby, KS (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 10/601,044

(22) Filed: Jun. 20, 2003

(65) Prior Publication Data

US 2004/0256564 A1    Dec. 23, 2004

(51) Int. Cl.
*G01J 5/02* (2006.01)
(52) U.S. Cl. .............................. 250/339.11; 250/341.8
(58) Field of Classification Search ........... 250/339.11, 250/341.8; 374/7; 356/630
See application file for complete search history.

(56) References Cited

U.S. PATENT DOCUMENTS

| | | | |
|---|---|---|---|
| 3,017,512 A | 1/1962 | Wolbert | |
| 3,733,485 A | 5/1973 | Gaynor et al. | |
| 3,973,122 A | 8/1976 | Goldberg | |
| 3,994,586 A * | 11/1976 | Sharkins et al. | 250/339.11 |
| 4,015,127 A | 3/1977 | Sharkins | |
| 4,549,079 A | 10/1985 | Terasaka et al. | |
| 4,703,187 A * | 10/1987 | Hofling et al. | 250/559.28 |
| 4,748,329 A * | 5/1988 | Cielo et al. | 250/559.28 |
| 4,791,296 A | 12/1988 | Carpio | |
| 4,800,279 A | 1/1989 | Hieftje et al. | |
| 5,015,856 A | 5/1991 | Gold | |
| 5,091,647 A | 2/1992 | Carduner et al. | |
| 5,289,266 A | 2/1994 | Shih et al. | |
| 5,381,228 A | 1/1995 | Brace | |
| 5,483,338 A | 1/1996 | Wachter et al. | |
| 5,573,952 A | 11/1996 | Moessner | |
| 6,052,191 A | 4/2000 | Brayden, Jr. et al. | |
| 6,184,528 B1 | 2/2001 | DiMarzio et al. | |
| 6,671,047 B1 | 12/2003 | Opsal et al. | |
| 6,675,029 B1 | 1/2004 | Monfre et al. | |

(Continued)

FOREIGN PATENT DOCUMENTS

DE    2252527    10/1972

(Continued)

OTHER PUBLICATIONS

Pavlovic et al., "Optical and Microstructural Properties of Anodically Oxidized Aluminum", Elsevier Sequoia, Thin Solid Films, 138, pp. 97-109, 1986.

(Continued)

*Primary Examiner*—David Porta
*Assistant Examiner*—Frederick F. Rosenberger
(74) *Attorney, Agent, or Firm*—Lee & Hayes, PLLC (57) ABSTRACT

A non-destructive method is provided for measuring a non-scattering coating on a non-specular or specular surface of a metallic substrate. The surface may be a rough surface, such as a chemically milled surface. Infrared energy is transmitted into an integrating sphere that is in physical contact with a sample of the coating on the metallic substrate. The infrared energy is partially absorbed by the coating. The infrared energy is in part specularly reflected by the metallic substrate and is in part scattered by the metallic substrate depending on the wavelength of the infrared radiation. The integrating sphere integrates and collects total reflectance of the infrared energy. Infrared detectors detect the total reflectance at two wavelength bands. A decrease in total reflectance in one of the two wavelength bands indicates presence of the coating or may be mapped to an amount of the coating.

16 Claims, 4 Drawing Sheets

U.S. PATENT DOCUMENTS

| | | |
|---|---|---|
| 6,697,654 B1 | 2/2004 | Lorenz et al. |
| 6,734,962 B1 | 5/2004 | Treado et al. |
| 6,784,431 B1 * | 8/2004 | Shelley et al. ............ 250/341.8 |
| 6,794,651 B1 | 9/2004 | Shelley et al. |
| 6,853,926 B1 | 2/2005 | Alfano et al. |
| 6,895,360 B1 | 5/2005 | Liu et al. |
| 6,903,339 B1 * | 6/2005 | Shelley et al. .......... 250/339.01 |
| 6,906,327 B1 * | 6/2005 | Shelley et al. .......... 250/339.01 |
| 6,919,957 B1 | 7/2005 | Nikoonahad et al. |

FOREIGN PATENT DOCUMENTS

| | | |
|---|---|---|
| DE | 2252527 A * | 5/1974 |
| WO | 2 680 240 | 8/1991 |
| WO | WO 01/92820 | 12/2001 |
| WO | WO 2004/048888 | 11/2003 |

OTHER PUBLICATIONS

Laet, et al., "Development of an Optical Model for Steady State Porous Anodic Films on Aluminum Formed in Phosphoric Acid", Elsevier Science S.A., Thin Solid Films, 320, pp. 241-252, 1998.

Anicai, L., Analysis of Electrochemical Colored Aluminum Anodic Films in AgNO3-Based Electrolytes by Diffuse Reflectance Spectra Elsevier Science, Inc., Metal Finishing, pp. 10-13, 1998.

Standard Guide for Preparation of Aluminum Surfaces for Structural Adhesives Bonding (Phosphoric Acid Anodizing), ASTM International Designation: D 3933-98. Copyright 2003, pp. 3-4, American Society for Testing and Materials, 100 Barr Harbor Dr., West Conshohocken, PA 19428.

Drukker, et al., "Mechanical and Chemical Consequences of through thickness thermal gradients in polyimide matrix composite materials", Elsevier, Composites Part A: applied science and manufacturing, www.elsevier.com/locate/composites, pp. 125-133, 2003.

Mehrkam, et al., "Detection of Composite Heat Damage By Drift Spectroscopy", 38th International SAMPE Symposium, XP009046905, pp. 217-223, 1993.

Powell, et al., Nondestructive Inspection of Heat Damage to Graphite-Epoxy Laminates Using Diffuse Reflectance Fourier Transform Infrared Spectroscopy (DRIFTS), 29th International SAMPE Technical Conference, XP009046906, pp. 766-775, 1997.

Kumar et al., "Studies on anodic oxide coating with low absorptance and high emittance on aluminum alloy 2024," Solar Energy Material & Solar Cells 60 (2000), pp. 51-57, Received Feb. 22, 1999, received in revised form Apr. 12, 1999, accepted Jun. 1, 1999, www.elsevier.com.

Kumar et al., "Studies on white anodizing on aluminum alloy for space applications," Applied Surface Science 151 (1999), pp. 280-286, Received Mar. 20, 1999, accepted May 31, 1999, www.elsevier.com.

* cited by examiner

METHOD OF MEASURING COATING USING TWO-WAVELENGTH INFRARED REFLECTANCE

RELATED APPLICATION

This patent application is related to a co-pending patent application Ser. No. 10/171,579, filed Jun. 13, 2002 and entitled "METHOD OF MEASURING ANODIZE COATING AMOUNT USING INFRARED ABSORBANCE," the content of which is hereby incorporated by reference.

FIELD OF THE INVENTION

This invention relates generally to measuring coating amount and, more specifically, to measuring coating amount on metal surfaces.

BACKGROUND OF THE INVENTION

Anodized coatings are created upon metallic substrates for a great variety of purposes. For example, aluminum aircraft parts often receive an anodized coating for corrosion resistance and for enhanced paint adhesion. Anodize coatings are also used for decorative purposes. Generally, a uniform coating amount or a coating amount within an acceptable range is desired. However, determining uniformity of the coating amount or quantifying the coating amount relative to a desired range may be difficult. Current coating amount testing methods are destructive and therefore cannot be used with final production products. They are also time consuming, environmentally unfriendly, and disruptive to large scale production processes. Anodize coating amount is sometimes specified for some applications and there is no simple non-destructive evaluation for measurement of anodize amount currently known in the art.

Current coating amount testing known in the art is performed by measuring the weight of a coated metallic test specimen. The coating is then chemically removed from the specimen. The metallic substrate is reweighed and the difference is the amount of the anodized coating, which is normally given in milligrams per square foot (mg/ft2). Because the test method is destructive, it cannot be used on the manufactured product. In addition, the currently known testing process only generates a spatially averaged coating amount for the sample. As such, the currently known testing process does not determine coating amount variations over an area.

A notable limitation of the above coating weight method derives from dissimilarity of anodizing conditions between the metallic test specimen and the production parts. For relatively poorly conducting anodize solutions, e.g. phosphoric acid anodize, the part-to-cathode geometry influences the anodize current density achieved. If the metallic test specimen does not encounter "cathode shadowing" while the production part does, then the coating weight attained on the test specimen is not representative of that obtained on the production part.

For some of the thicker anodize coatings, e.g. sulfuric acid anodize and boric-sulfuric acid anodize, nondestructive testing using a conductivity tester can qualitatively indicate that anodize coating has been applied to a metallic substrate. The anodize coating, if present in sufficient thickness, insulates the metallic substrate from the test probes of the continuity tester. This test only shows that sufficient anodize was formed to withstand the mechanical pressure of placing electrical contact probes on the anodize surface. Excessive pressure and slipping at the contact-to-part interface will break through the anodize layer and cause a false indication of inadequate anodize.

For thinner anodize coatings, e.g. phosphoric acid anodizing for structural adhesive bonding, another method of determining whether or not a sufficient amount of anodize coating has been applied to a metallic substrate is by observing color of thin film interference presented by the anodize coating. In the case of phosphoric acid anodizing, birefringence of the anodize coating, that is, a different optical path length depending upon orientation of light polarization, causes the color to change when the polarizer is rotated (cross-polar inspection).

Advances in non-destructive measurement of anodize coating amount have been made. For example, in U.S. patent application Ser. No. 10/171,579, filed Jun. 13, 2002 and entitled "METHOD OF MEASURING ANODIZE COATING AMOUNT USING INFRARED ABSORBANCE" and assigned to The Boeing Company, a method is disclosed for measuring amount of anodize coating using absorbance of a specular component of infrared energy at one wavelength. While this method yields accurate results for specular surfaces, it does not address compensating for scattering of infrared energy from rough surfaces.

Neither visual inspection nor single-frequency infrared absorbance methods address compensation for surface roughness of a substrate underlying an anodize coating. As a result, there is an unmet need in the art for a method for determining an amount of anodize coating on a metallic substrate that compensates for surface roughness of the substrate.

SUMMARY OF THE INVENTION

The present invention provides a non-destructive, quantitative method of determining an amount of a non-scattering, specular coating, such as anodize coating, on a rough substrate, such as a chemically milled metallic substrate. As a result, the present invention provides improved consistency over visual inspection. Further, the present invention measures total reflectance instead of absorbance of a specular component. Therefore, less complex optical equipment can be used to measure anodize coating according to the present invention.

In one embodiment of the present invention, a non-destructive method is provided for measuring a non-scattering coating on a metallic substrate, the surface of which may be non-specular or specular. The surface may be a rough surface, such as a chemically milled surface. Infrared energy is transmitted into an integrating sphere that is in physical contact with a sample of the coating on the metallic substrate. The infrared energy is partially absorbed by the coating. The infrared energy is in part specularly reflected by the metallic substrate and is in part scattered by the metallic substrate depending on the wavelength of the infrared radiation. The integrating sphere integrates and collects total reflectance of the infrared energy. Infrared detectors detect the total reflectance at two wavelength bands. A decrease in total reflectance in one of the two wavelength bands indicates presence of the coating or may be mapped to an amount of the coating.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
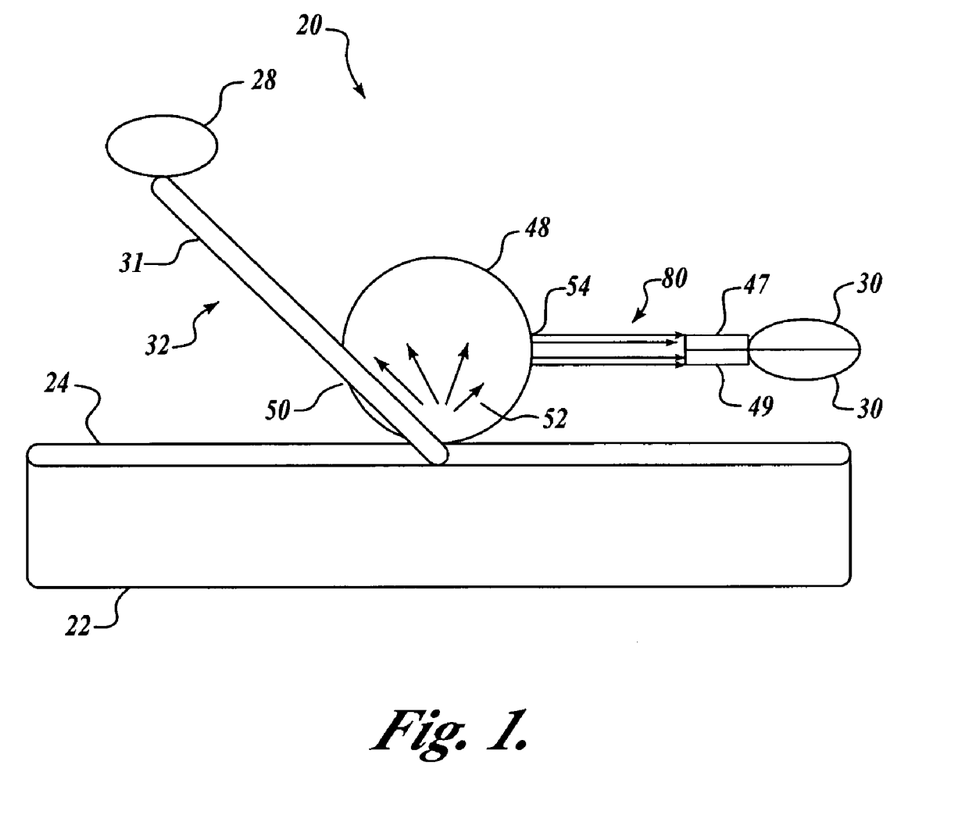
FIG. 1 is a side view of a testing setup.

By way of overview and with reference to FIG. 1, one presently preferred embodiment of the present invention determines amount of a non-scattering, that is specular, coating 24 on a specular or non-specular substrate 22 using a testing setup 20. By way of non-limiting example, the coating 24 may be an anodize coating such as phosphoric acid anodize and the substrate 22 may be a metallic substrate such as aluminum. An infrared transmission beam 31 is transmitted from an infrared source 28 along a predetermined incident beam path 32 and into an entrance port 50 of an integrating sphere 48 that is placed in contact with a sample of the non-scattering coating 24. The infrared beam 31 is partially absorbed by the coating 24 and reflected and scattered by the substrate 22, and is hemispherically reflected and integrated in the integrating sphere 48. Collected and integrated hemispherically-reflected infrared radiation beams 80 exit the integrating sphere 48 through an exit port 54, are filtered at first and second wavelength ranges by a pair of filters 47 and 49, and are detected by a pair of infrared detectors 30. The first and second wavelength ranges are advantageously selected such that infrared energy is expected to be absorbed by the coating 24 at one of the wavelength ranges but not at the other wavelength range. A difference is determined between amounts of infrared energy of the integrated collected infrared beams 80 detected at the first and second wavelengths. The difference between the amounts of detected infrared energy at the first and second wavelengths corresponds to an amount of infrared energy absorbed by the coating 24. The amount of infrared energy absorbed by the coating 24, in turn, is proportional to an amount of the coating 24. Therefore and advantageously, the difference between the detected infrared energy at the first and second wavelengths is proportional to the amount of the coating 24. When the difference between the detected infrared energy at the first and second wavelengths is at least a predetermined difference, then at least a predetermined amount of the coating 24 is determined to be coated on the substrate 22. Specific details of the testing setup 20 are described with more particularity below.

In one non-limiting embodiment described herein for illustrative purposes only, a measurement is conducted for a specular, non-scattering coating 24 on a rough, non-specular substrate 22. Given by way of non-limiting example, the coating 24 is suitably an anodize coating, such as phosphoric acid anodize. However, measurements of other specular coatings 24, such as without limitation alodine, sol-gel, other chemical conversion coatings such as blueings, and the like, are considered within the scope of this invention. In order to measure the thickness of other coatings 24 that are not illustrated herein, one simply selects suitable wavelength bands that change with each different material used for the coating 24.

The substrate 22 may be suitably rough and need not be polished. As is known, coatings adhere better to rough surfaces than to polished, mirror-like surfaces. However, according to the present invention use of total reflectance of infrared energy at the first and second wavelengths advantageously compensates for scattering caused by roughness of the surface of the substrate 22, as will be explained below.

Given by way of non-limiting example, the substrate 22 is suitably a metallic substrate, such as aluminum. However, it will be appreciated that other substrates, with good reflectivity at both the first and second wavelength ranges, may be used as desired for a particular application.

In one present embodiment, the testing setup 20 suitably includes the infrared source 28, infrared beam optics, the integrating sphere 48 that contacts the sample of the coating 24, the filters 47 and 49, the detectors 30, and a data system (not shown). An exemplary system, given by way of non-limiting example, that may be used for the testing setup 20 includes a Portable Infrared Reflectance Measurement System (PIRMS) available from The Boeing Company. PIRMS includes a chopped infrared source, an integrating sphere, four filters, and four detectors. Advantageously, PIRMS measures reflectance in 3–4 µm, 3–5 µm, 4–5 µm, and 8–12 µm wavelength bands. PIRMS also includes a processor, a display, and an operator input interface. While PIRMS advantageously provides in one hand-held unit the infrared source 28, the integrating sphere 48, the filters 47 and 49, the detectors 30, and the data system (not shown), it will be appreciated that the above components may be provided separately.

The infrared beam 31 is suitably transmitted as a broadband mid-infrared light beam (2.5 to 25 microns typically). The infrared source 28 is suitably a chopped infrared source, such as that included in PIRMS. Alternately, the infrared source 28 may be a heated blackbody source.

The integrating sphere 48 is suitably any acceptable integrating sphere known in the art, such as without limitation those made by Labsphere. The integrating sphere 48 is placed in contact in a known manner with the coating 24. The integrating sphere 48 includes an entrance port 50 and an exit port 54. The beam 31 enters the integrating sphere 48 through the entrance port 50. Total reflectance 52 is collected in the integrating sphere 48 in a known manner. Collected total reflectance beams 80 exit the integrating sphere 48 via the exit port 54.

In one exemplary embodiment, the collected beams 80 are suitably filtered by the pair of filters 47 and 49 at two different wavelength bands. However, in another embodiment, the infrared transmission beam 31 is filtered by the filters 47 and 49. In one exemplary embodiment, the first wavelength band is in a range from around 7 µm to around 8 µm, and the second wavelength band is a range from around 11 µm to around 11.5 µm. In this non-limiting example, absorbance of infrared energy by phosphoric acid anodize coating is not expected in the first wavelength band from around 7 µm to around 8 µm. However, absorbance of infrared energy by phosphoric acid anodize coating is expected in the second wavelength band from around 11 µm to around 11.5 µm. It will be appreciated that an optimal wavelength for a desired application may deviate from the exemplary wavelength discussed above depending on the material to be measured by selecting one wavelength band at which infrared absorbance is expected and another wavelength band at which infrared absorbance is not expected. Further, it will be appreciated that the filters 47 and 49 may suitably be implemented by any relevant optical technique to perform the wavelength filtering function.

As discussed above, the coating 24 partially absorbs infrared radiation, thereby reducing reflectance from the substrate 22. However, it will be appreciated that changes in finish of the surface of the substrate 22 can also cause changes in reflectivity. For example, a rough surface lowers the surface gloss and causes increased scattering and, with sufficient roughness, increased absorbance of incident optical radiation—that is, a loss in specular reflectivity and a loss in total (hemispherical) reflectivity.

Advantageously, the present invention discriminates between a reduction in reflectivity from absorbance by the coating 24 and a reduction in reflectivity from roughness of the surface of the substrate 22 by use of two wavelength bands and by measurement of total reflectivity. As is known, total reflectance includes two components—specular reflectance and diffuse reflectance (also referred to as scattering). For a case when the coating 24 is coated on a highly-polished, mirror-like (that is, specular) surface of the substrate 22, a difference between either specular reflectance or total reflectance at the two wavelength bands is proportional to an amount of absorbance of the infrared radiation by the coating. For this case of the coating 24 on the substrate 22 with a highly-polished, mirror-like surface, it will be appreciated that the substrate 22 does not cause absorbance, scattering, or diffuse reflection of the incident infrared radiation. Instead, the substrate 22 specularly reflects the incident infrared radiation. Therefore, the substrate 22 does not contribute to any reduction in reflectance. As a result, any reduction in reflectance is due solely to absorbance of the infrared radiation by the coating 24. Thus, detection of the coating 22 is simplified when the coating 24 is coated on a substrate 22 with a highly-polished, mirror like surface.

However, as is known, adhesion of the coating 24 to the substrate 22 is not optimized when the substrate 22 has a highly-polished, mirror like surface. Instead, adhesion of the coating 24 to the substrate 22 is enhanced when the substrate 22 has a rough surface that is not highly-polished or mirror-like. That is, the surface of the substrate is non-specular. Advantageously, the present invention compensates for roughness of the non-specular surface of the substrate 22. This compensation permits the present invention to determine presence of the coating 24 when the surface of the substrate 22 is non-specular. This compensation is explained below.

Figure 2:
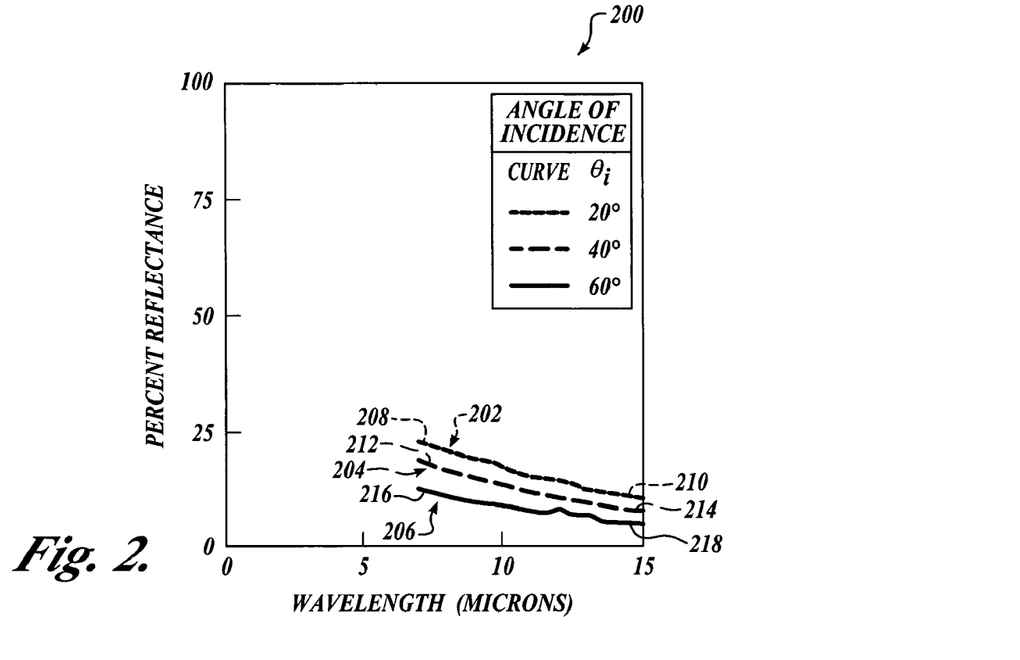
FIGS. 2–5 are graphs of reflectance versus wavelength.

When the surface of the substrate 22 is rough, a portion of the incident infrared radiation is scattered by the rough surface of the substrate 22. This is because wavelength of the incident radiation may be comparable to roughness of the surface. For example, FIG. 2 shows a graph 200 of a diffuse portion of reflectance of incident radiation on bare (that is, uncoated and not cladded with a thin layer of unalloyed aluminum) 2024 Aluminum. Percent of reflected energy along a Y axis is graphed versus wavelength (in microns) along an X axis. A curve 202 plots data for an angle of incidence of 20 degrees; a curve 204 plots data for an angle of incidence of 40 degrees; and a curve 206 plots data for an angle of incidence of 60 degrees. The curve 202 begins with a data point 208 at a relative percent of 22 percent at 7 microns (μm); the curve 204 begins with a data point 212 at a relative percent of 18 percent at 7 μm; and the curve 206 begins with a data point 216 at a relative percent of 12 percent at 7 μm. As is known, as wavelength increases, the wavelength becomes relatively greater than roughness of the surface. That is, the wavelength of the incident radiation becomes less comparable to the roughness of the surface. The surface of the substrate therefore appears smoother or more polished (that is, more specular) relative to the wavelength of the incident radiation. As a result, less incident radiation scatters from a rough surface, such as the rough, non-specular surface of the substrate 22 (FIG. 1), at a longer wavelength than at a shorter wavelength. As a result, diffuse reflectance decreases. Accordingly, the curve 202 steadily decreases from the data point 208 to a data point 210 at a relative percent of 10 percent at 15 μm. Similarly, the curve 204 steadily decreases from the data point 212 to a data point 214 at a relative percent of 8 percent at 15 μm. Likewise, the curve 206 steadily decreases from the data point 216 to a data point 218 at a relative percent of 4 percent at 15 μm.

Figure 3:
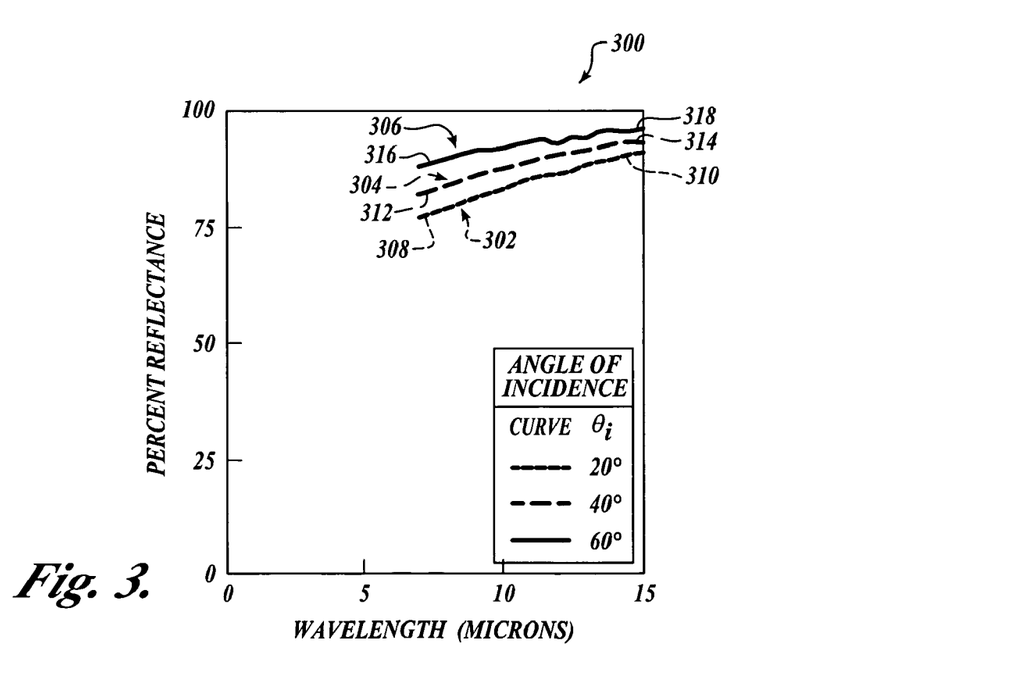

The converse is true for the specular portion of total reflectance as wavelength increases. For example, FIG. 3 shows a graph 300 of a specular portion of reflectance of incident radiation on bare (that is, uncoated and uncladded) 2024 Aluminum. Percent of reflected energy along a Y axis is graphed versus wavelength (in microns) along an X axis. A curve 302 plots data for an angle of incidence of 20 degrees; a curve 304 plots data for an angle of incidence of 40 degrees; and a curve 306 plots data for an angle of incidence of 60 degrees. The curve 302 begins with a data point 308 at a relative percent of 78 percent at 7 μm; the curve 304 begins with a data point 312 at a relative percent of 82 percent at 7 μm; and the curve 306 begins with a data point 316 at a relative percent of 88 percent at 7 μm. As discussed above, as wavelength increases, the wavelength becomes relatively greater than roughness of the surface. That is, the wavelength of the incident radiation becomes less comparable to the roughness of the surface. The surface of the substrate therefore appears smoother or more polished (that is, more specular) relative to the wavelength of the incident radiation. As a result, more of the incident radiation specularly reflects from a rough surface, such as the rough, non-specular surface of the substrate 22 (FIG. 1), at a longer wavelength than at a shorter wavelength. As a result, specular reflectance increases. Accordingly, the curve 302 steadily increases from the data point 308 to a data point 310 at a relative percent of 90 percent at 15 μm. Similarly, the curve 304 steadily increases from the data point 312 to a data point 314 at a relative percent of 92 percent at 15 μm. Likewise, the curve 306 steadily increases from the data point 316 to a data point 318 at a relative percent of 96 percent at 15 μm.

Figure 4:
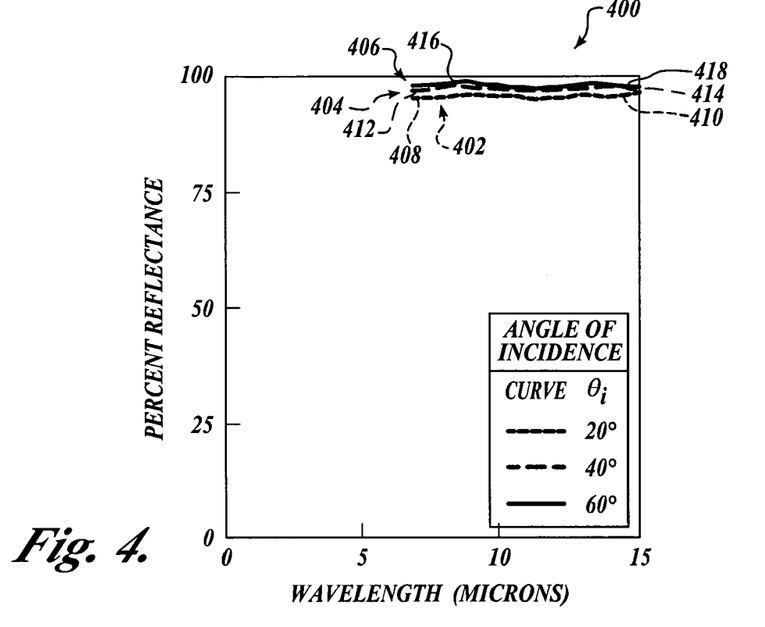

It will be appreciated that total reflectance of incident radiation on a rough, uncoated substrate remains constant as wavelength of the incident radiation increases consistent with the inherent reflectivity characteristic of the substrate. That is, decreases in diffuse reflectance are substantially offset by corresponding increases in specular reflectance as explained above. For example, FIG. 4 shows a graph 400 of total reflectance of incident radiation on bare (that is, uncoated and uncladded) 2024 Aluminum. Percent of reflected energy along a Y axis is graphed versus wavelength (in microns) along an X axis. A curve 402 plots data for an angle of incidence of 20 degrees; a curve 404 plots data for an angle of incidence of 40 degrees; and a curve 406 plots data for an angle of incidence of 60 degrees. It will be appreciated that the curve 402 plots total reflectance that includes the diffuse reflectance portion plotted in the curve 202 (FIG. 2) and the specular reflectance portion plotted in the curve 302 (FIG. 3). Similarly, the curve 404 plots total reflectance that includes the diffuse reflectance portion plotted in the curve 204 (FIG. 2) and the specular reflectance portion plotted in the curve 304 (FIG. 3). Likewise, the curve 406 plots total reflectance that includes the diffuse reflectance portion plotted in the curve 206 (FIG. 2) and the specular reflectance portion plotted in the curve 306 (FIG. 3). The curve 402 begins with a data point 408 at a relative percent of 96 percent at 7 μm, remains substantially constant, and ends at a data point 410 at a relative percent of at 96 percent at 15 μm; the curve 404 begins with a data point 412 at a relative percent of 96 percent at 7 μm, remains substantially constant, and ends at a data point 414 at a relative percent of 98 percent at 15 μm; and the curve 406 begins with a data point 416 at a relative percent of 98 percent at 7 µm, remains substantially constant, and ends at a data point 418 at a relative percent of 98 percent at 15 µm.

However, total reflectance may differ at different wavelengths when a non-specular substrate, such as the substrate 22 (FIG. 1), is coated with a coating, such as the coating 24 (FIG. 1). According to the present invention, such differences advantageously may be due to partial absorbance of infrared radiation at certain wavelengths by the coating. As will be set forth in detail below, the present invention relates a decrease in total reflectance of incident radiation from a rough surface that is coated with a coating to presence of the coating. As discussed above, total reflectance of infrared radiation from an uncoated, non-specular substrate remains substantially constant. Thus, the decrease in total reflectance from a coated, non-specular substrate is not caused by or attributed to the non-specular substrate itself. Instead, according to the present invention, the decrease in total reflectance at a predetermined wavelength results because some of the incident radiation is partially absorbed by the coating. Therefore, the decrease in total reflectance advantageously indicates presence of the coating 24 on the non-specular substrate 22.

Figure 5:
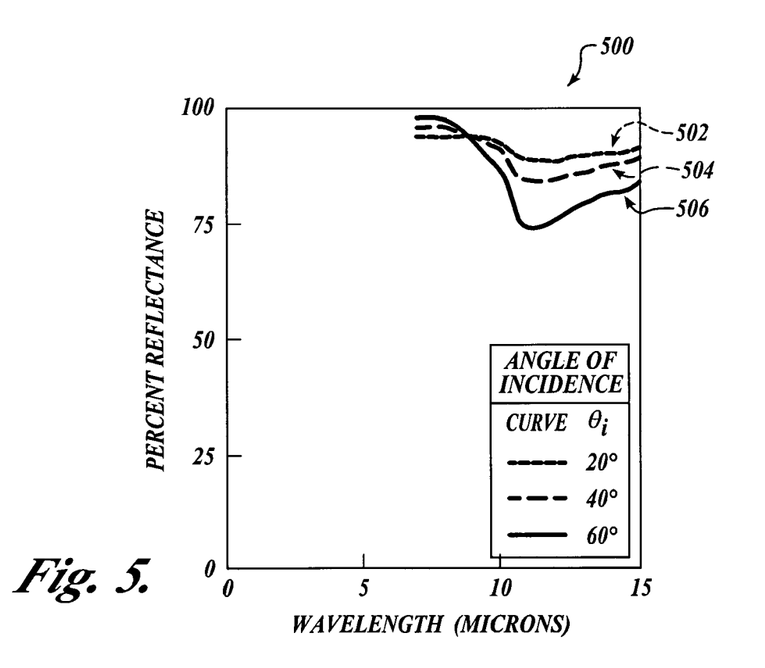

Details of a non-limiting example are set forth below. Referring now to FIG. 5, a graph 500 plots total reflectance of infrared radiation from 2024 Aluminum coated with a phosphoric acid anodize coating versus wavelength of the infrared radiation. Percent of reflected energy along a Y axis is graphed versus wavelength (in microns) along an X axis. A curve 502 plots data for an angle of incidence of 20 degrees; a curve 504 plots data for an angle of incidence of 40 degrees; and a curve 506 plots data for an angle of incidence of 60 degrees. Total reflectance along the curves 502, 504, and 506 remains substantially constant at around 96 percent from 7 µm to around 8 µm. However, total reflectance begins to decrease at a wavelength of around 8 µm. Total reflectance along the curve 502 decreases to around 89 percent at a wavelength of around 11 µm; total reflectance along the curve 504 decreases to around 84 percent at a wavelength of around 11 µm; and total reflectance along the curve 506 decreases to around 74 percent at a wavelength of around 11 µm. The decrease in total reflectance along the curve 506 is steeper and more pronounced than the decrease along the curves 502 and 504. The low points in total reflectance at wavelengths around 11 µm correspond to expected absorbance peaks at this wavelength band for phosphoric acid anodize. Therefore, according to the present invention, the low points in total reflectance on the curves 502, 504, and 506 indicate presence of phosphoric acid anodize coating on a non-specular substrate of 2024 Aluminum. Because phosphoric acid anodize does not absorb infrared radiation at wavelengths greater than the 11–12 µm wavelength band (that are shown in the graph 500), total reflectance increases for wavelengths above the 11–12 µm wavelength band.

It will be appreciated that amount of infrared radiation absorbed in the coating is proportional to the amount of the coating. It will be further appreciated that the reduction in total reflectance is attributed to absorbance of infrared radiation by the coating. Therefore, according to the invention, the reduction in total reflectance of infrared radiation from a non-specular substrate coated with a coating is proportional to the amount of the coating. Advantageously, a difference between total reflectance at two different wavelengths can indicate presence of a coating on a non-specular substrate. For example, a difference between total reflectance for the curves 502, 504, or 506 at the 7–8 µm wavelength band and total reflectance for the curves 502, 504, or 506 at the 11–12 µm wavelength band is proportional to amount of phosphoric acid anodize coating on a substrate of 2024 Aluminum. This is because no absorbance of phosphoric acid anodize occurs in the 7–8 µm wavelength band, but absorbance of phosphoric acid anodize does occur in the 11–12 µm wavelength band. If desired, a reduction in total reflectance of a predetermined, threshold amount can correlate to a threshold amount of coating, such as phosphoric acid anodize. This permits a go/no-go type determination that a minimum, acceptable amount of coating is present. Alternately, amount of reduction of total reflectance can be mapped to previously-determined quantities of a coating to permit quantitative determination of an amount of the coating. An example of such a quantitative mapping is set forth in U.S. patent application Ser. No. 10/171,579, filed Jun. 13, 2002 and entitled "METHOD OF MEASURING ANODIZE COATING AMOUNT USING INFRARED ABSORBANCE" and assigned to The Boeing Company, the content of which is hereby incorporated by reference.

Figure 6:
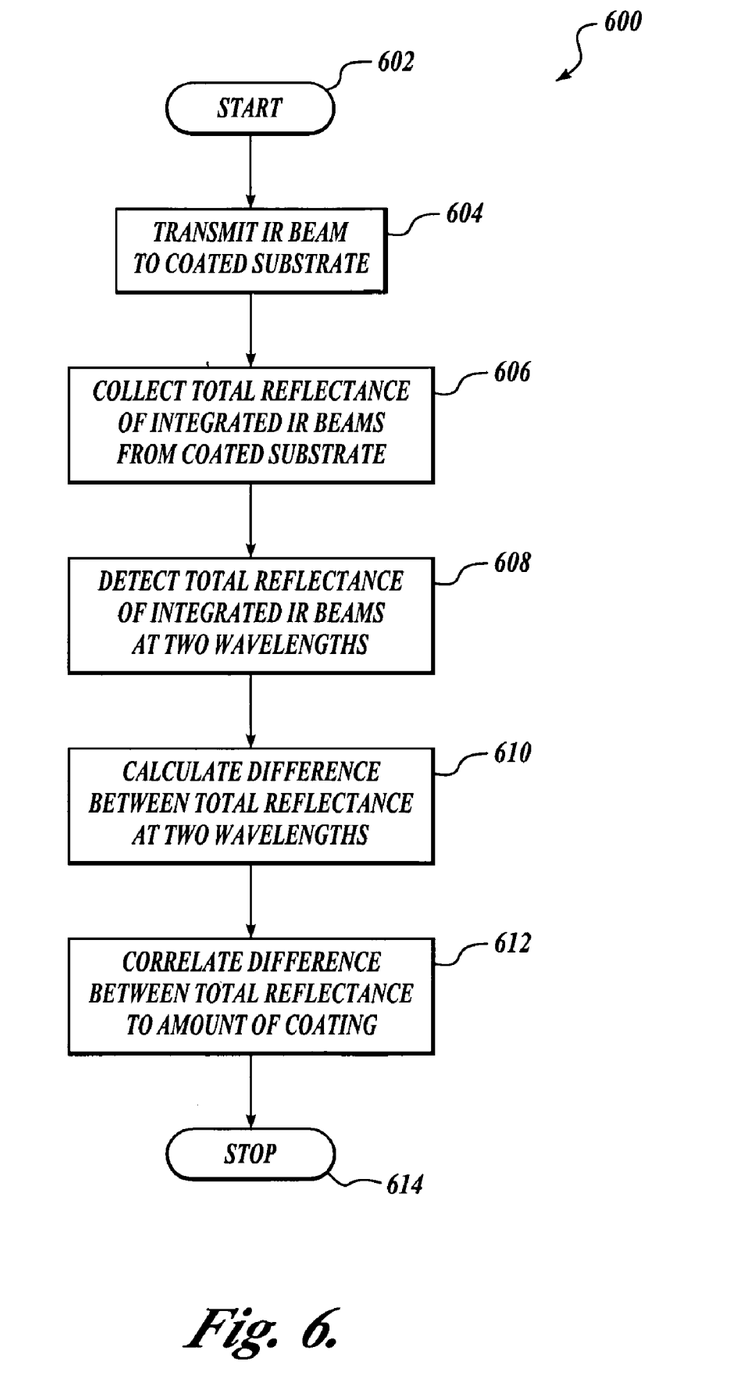
FIG. 6 is a flow chart of a testing process.

Referring now to FIGS. 1 and 6 and given by way of non-limiting example, a process 600 for determining amount of a coating on a non-specular substrate starts at a block 602. At a block 604, an incident infrared beam is transmitted toward a substrate with a rough, that is non-specular, surface that is coated with a coating. In one presently preferred embodiment, the incident infrared beam is transmitted at two different wavelength bands. One wavelength band is selected from wavelength bands in which a finite amount of incident infrared radiation is expected to be partially absorbed by the coating. The other wavelength band is selected from wavelength bands in which incident infrared radiation is not expected to be absorbed by the coating. In one embodiment the incident infrared beam is suitably transmitted with components at two wavelength bands by generating two separate incident beams at the two wavelength bands with two separate infrared sources. In another embodiment, the incident infrared beam is suitably a broadband infrared beam that is filtered at the two wavelength bands before the incident infrared beam impinges upon the coating. In an alternate embodiment, the incident infrared beam is suitably a broadband infrared beam that remains unfiltered or that is band-pass filtered such that the two wavelength bands are included in the incident infrared beam. As will be discussed below, in this alternate embodiment filtering at the two wavelength bands is performed in conjunction with detecting infrared energy. Regardless of whether the incident infrared radiation is a broadband beam or includes two discrete infrared radiation components at the two wavelength bands, the incident infrared radiation enters an entrance port of an integrating sphere and impinges upon the coating and travels through the coating. Infrared radiation at one of the wavelength bands is partially absorbed in the coating. The incident infrared radiation then impinges upon the non-specular surface of the substrate. Depending upon wavelength, as discussed above the infrared radiation is either scattered (that is, diffusely reflected) or specularly reflected from the non-specular surface of the substrate. After being either scattered or reflected by the non-specular surface of the substrate, the infrared radiation travels through the coating. Infrared radiation at one of the wavelength bands is again partially absorbed in the coating, and the infrared radiation emerges from the coating.

At a block 606 the integrating sphere integrates and collects total reflectance of the infrared radiation that emerges from the coating. The collected total reflectance exits the integrating sphere through an exit port.

At a block 608 the collected infrared radiation that exits the exit port of the integrating sphere is detected at the first and second wavelength bands. As discussed above, in one embodiment the incident infrared beam includes components only at the wavelength bands. In this case, the collected total reflectance that exits from the integrating sphere is suitably not filtered before detection. However, in an alternate embodiment discussed above, the incident infrared radiation is a broadband infrared radiation beam. In this case, the collected total reflectance that exits from the integrating sphere is filtered at the two wavelength bands before being detected by the detectors.

At a block 610 a difference is determined between intensity of energy levels of collected total reflectance at the two wavelength bands. The difference may be determined automatically by associated processing electronics or may be manually determined, as desired.

At a block 612, the difference between intensity of energy levels of collected total reflectance at the two wavelength bands is correlated to amount of the coating. As discussed above, advantageously the difference between intensity of energy levels of collected total reflectance at the two wavelength bands represents an amount of the infrared energy absorbed by the coating at the wavelength band at which absorbance is expected. Furthermore, an amount of the coating itself is proportional to the amount of the infrared energy absorbed by the coating. Therefore, the difference between intensity of energy levels of collected total reflectance at the two wavelength bands is proportional to the amount of the coating.

Determination of the difference and correlation of the difference at the blocks 610 and 612, respectively, are suitably performed in a number of acceptable manners. For example, in one embodiment, these operations are performed by a processor or microprocessor (not shown) arranged to perform mathematical operations. Any processor known in the art is acceptable such as, without limitation, a Pentium®-series processor available from Intel Corporation or the like. The processor is suitably included within the setup 20 (FIG. 1) and is also suitably provided as a stand-alone unit that is electrically connected to receive data from the infrared detectors 30. Alternately, the calculation is performed by an electronic computer chip or is performed manually.

In one embodiment, the correlation of the difference yields a go/no-go or pass/fail result that the coating amount meets a minimum threshold criteria for a desired application. That is, the difference is compared to a predetermined difference. If the difference is greater than or equal to the predetermined difference, then at least a minimum threshold amount of the coating desired for a particular application is present. This indicates a "go" or "pass" result. Conversely, if the difference is less than the predetermined difference, then less than the minimum threshold amount of the coating desired for a particular application is present. This indicates a "no-go" or "fail" result.

In another embodiment, an amount of the coating is generated by mapping the total reflectance difference to an amount of the coating. The total reflectance difference measurement is repeated for many different thicknesses of different coatings. A calibration is calculated for thickness or weight, as desired, by generating a plot or linear regression of thickness or weight values versus values of total reflectance difference. This calibration can then be used to calculate thickness or weight of the coating directly from total reflection difference values. This exemplary mapping protocol is similar to a protocol for calibrating amount or thickness of coatings to ratios of infrared absorbance as set forth in co-pending U.S. patent application Ser. No. 10/171,579, filed Jun. 13, 2002 and entitled "METHOD OF MEASURING ANODIZE COATING AMOUNT USING INFRARED ABSORBANCE," the content of which is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A non-destructive method of measuring a non-scattering coating on a metallic substrate, the method comprising:
   non-destructively determining at a first wavelength in a first range from around 7 µm to around 8 µm a first total amount of infrared energy reflected from a coated metallic substrate including aluminum with a scattering surface that is coated with a non-scattering coating of phosphoric acid anodize;
   non-destructively determining at a second wavelength in a second range from around 10.5 µm to around 12 µm a second total amount of infrared energy reflected from the coated metallic substrate;
   determining a difference between the first and second total amounts of infrared energy; and
   determining that at least a predetermined amount of the coating is coated on the coated metallic substrate when the difference between the first and second total amounts of infrared energy is at least a predetermined difference.

2. The method of claim 1, further comprising correlating the difference between the first and second total amounts of infrared energy to an amount of the coating.

3. The method of claim 1, wherein the second total amount of reflected infrared energy is less than the first total amount of reflected infrared energy.

4. A method of non-destructively measuring a non-scattering coating on a metallic substrate, the method comprising:
   transmitting an infrared beam into a non-scattering phosphoric acid anodize coating on a coated metallic substrate including aluminum with a scattering surface;
   collecting total reflectance of infrared energy from the coated metallic substrate;
   integrating the collected total reflectance;
   detecting a first amount of infrared energy of the collected total reflectance at a first wavelength in a first range from around 7 µm to around 8 µm and a second amount of infrared energy of the collected total reflectance at a second wavelength in a second range from around 10.5 µm to around 12 µm;
   determining a difference between the first and second amounts of infrared energy; and
   determining that at least a predetermined amount of the coating is coated on the substrate when the difference between the first and second amounts of infrared energy is at least a predetermined difference.

5. The method of claim 4, further comprising correlating the difference between the first and second amounts of infrared energy to an amount of the coating.

6. The method of claim 4, wherein the second amount of infrared energy is less than the first amount of infrared energy.

7. The method of claim 4, further comprising filtering at the first wavelength and at the second wavelength.

8. The method of claim 7, wherein the filtering is performed on the transmitted infrared beam.

9. The method of claim 7, wherein the filtering is performed on the integrated collected total reflectance.

10. The method of claim 4, wherein the total reflectance includes total hemispherical reflectance.

11. A method of non-destructively measuring a non-scattering coating on a metallic substrate, the method comprising:

transmitting an infrared beam into a non-scattering phosphoric acid anodize coating on a metallic substrate including aluminum with a non-specular surface;

collecting total hemispherical reflectance of infrared energy from the coated metallic substrate;

integrating the collected total hemispherical reflectance;

filtering at a first wavelength in a first range from around 7 μm to around 8 μm and a second wavelength relatively greater than a roughness of the non-specular surface that is longer than the first wavelength;

detecting a first amount of infrared energy of the collected total hemispherical reflectance at the first wavelength and a second amount of infrared energy of the collected total hemispherical reflectance at the second wavelength;

determining a difference between the first and second amounts of infrared energy; and determining that at least a predetermined amount of the coating is coated on the substrate when the difference between the first and second amounts of infrared energy is at least a predetermined difference.

12. The method of claim 11, wherein the second wavelength is in a second range from around 10.5 μm to around 12 μm.

13. The method of claim 11, further comprising correlating the difference between the first and second amounts of infrared energy to an amount of the coating.

14. The method of claim 11, wherein the second amount of infrared energy is less than the first amount of infrared energy.

15. The method of claim 11, wherein the filtering is performed on the transmitted infrared beam.

16. The method of claim 11, wherein the filtering is performed on the integrated collected total reflectance.

* * * * *